United States Patent
Sreekantaswamy et al.

(10) Patent No.: US 11,093,289 B2
(45) Date of Patent: Aug. 17, 2021

(54) PROVISIONING DISASTER RECOVERY RESOURCES ACROSS MULTIPLE DIFFERENT ENVIRONMENTS BASED ON CLASS OF SERVICE

(71) Applicant: International Business Machines Corporation, Armonk, NY (US)

(72) Inventors: Srinath Nadig Sreekantaswamy, Bengaluru (IN); Vinodraj Kuppusamy, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 16/443,162

(22) Filed: Jun. 17, 2019

(65) Prior Publication Data

US 2020/0394072 A1    Dec. 17, 2020

(51) Int. Cl.
*G06F 9/50*    (2006.01)
*G06F 11/07*   (2006.01)

(52) U.S. Cl.
CPC ............ *G06F 9/5011* (2013.01); *G06F 9/505* (2013.01); *G06F 9/5044* (2013.01); *G06F 11/0709* (2013.01); *G06F 11/0793* (2013.01); *G06F 2209/5011* (2013.01)

(58) Field of Classification Search
CPC ............ G06F 11/0709; G06F 11/0793; G06F 2209/5011; G06F 9/5011; G06F 9/5044; G06F 9/505
See application file for complete search history.

(56) References Cited

U.S. PATENT DOCUMENTS

| 10,027,558 B2 | 7/2018 | Gupta et al. | |
| 2005/0210245 A1* | 9/2005 | Rolia | G06F 9/5044 713/166 |
| 2016/0048408 A1* | 2/2016 | Madhu | G06F 11/2023 718/1 |
| 2016/0366218 A1* | 12/2016 | Cors | H04L 67/10 |

(Continued)

FOREIGN PATENT DOCUMENTS

CN    108833153 A    11/2018

OTHER PUBLICATIONS

Gu et al., "DR-Cloud: Multi-Cloud Based Disaster Recovery Service," Tsinghua Science and Technology, vol. 19, No. 1, Feb. 2014, pp. 13-23.

(Continued)

*Primary Examiner* — Jorge A Chu Joy-Davila
(74) *Attorney, Agent, or Firm* — Yee & Associates, P.C.

(57) ABSTRACT

Disaster recovery resource provisioning is provided. Infrastructure resource objects are grouped into a plurality of resource pools based on resource characteristics of each respective infrastructure resource object. A set of resource capabilities is provided for seamless resource provisioning for each resource pool in the plurality of resource pools. A class of service is mapped to a resource pool corresponding to a workload spread across multiple environments considering primary workload production and secondary disaster recovery requirements. Resources are automatically provisioned from the class of service required in providing disaster recovery for the workload based on characteristics of the workload, cost, business needs, and service level agreement metrics corresponding to the disaster recovery.

18 Claims, 9 Drawing Sheets

(56) References Cited

U.S. PATENT DOCUMENTS

2019/0075155 A1 3/2019 Wei et al.
2019/0370132 A1* 12/2019 Salapura ............. G06F 12/0873

OTHER PUBLICATIONS

Mell et al., "The NIST Definition of Cloud Computing", Computer Security Division, National Institute of Standards and Technology, Jan. 2011, 7 pages.
"Topology and Orchestration Specification for Cloud Applications Version 1.0," Oasis Standard, Nov. 25, 2013, accessed Jun. 17, 2019, 102 pages. docs.oasis-open.org/tosca/TOSCA/v1.0/os/TOSCA-v1.0-os.html.
Wikipedia, "Software-defined data center," Wikimedia Foundation, Inc., last edited Jun. 16, 2019, accessed Jun. 17, 2019, 4 pages. en.wikipedia.org/wiki/Software-defined_data_center.

* cited by examiner

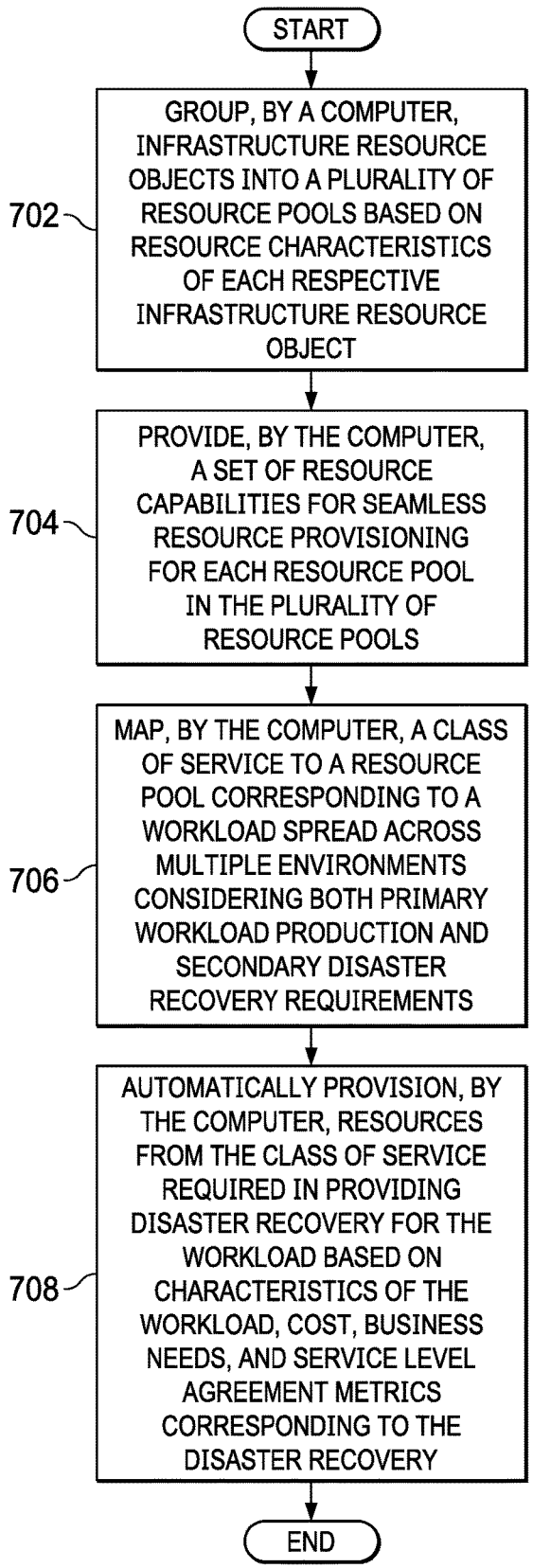
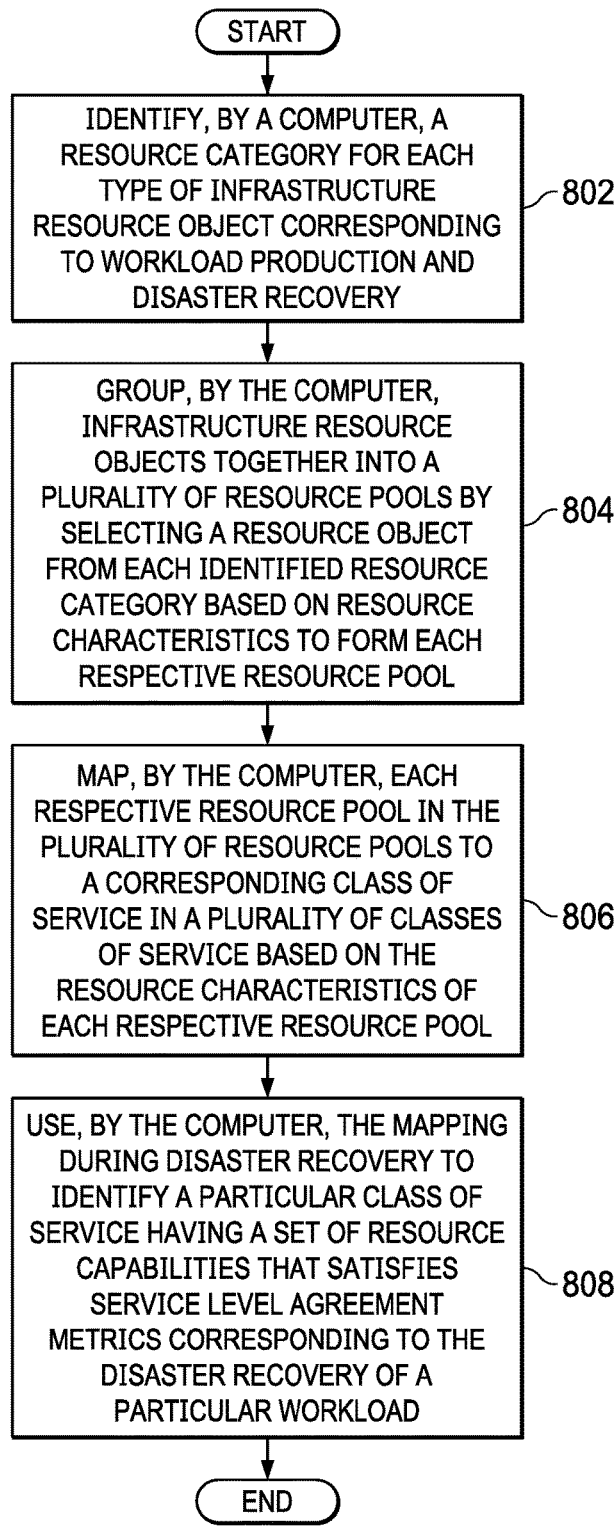

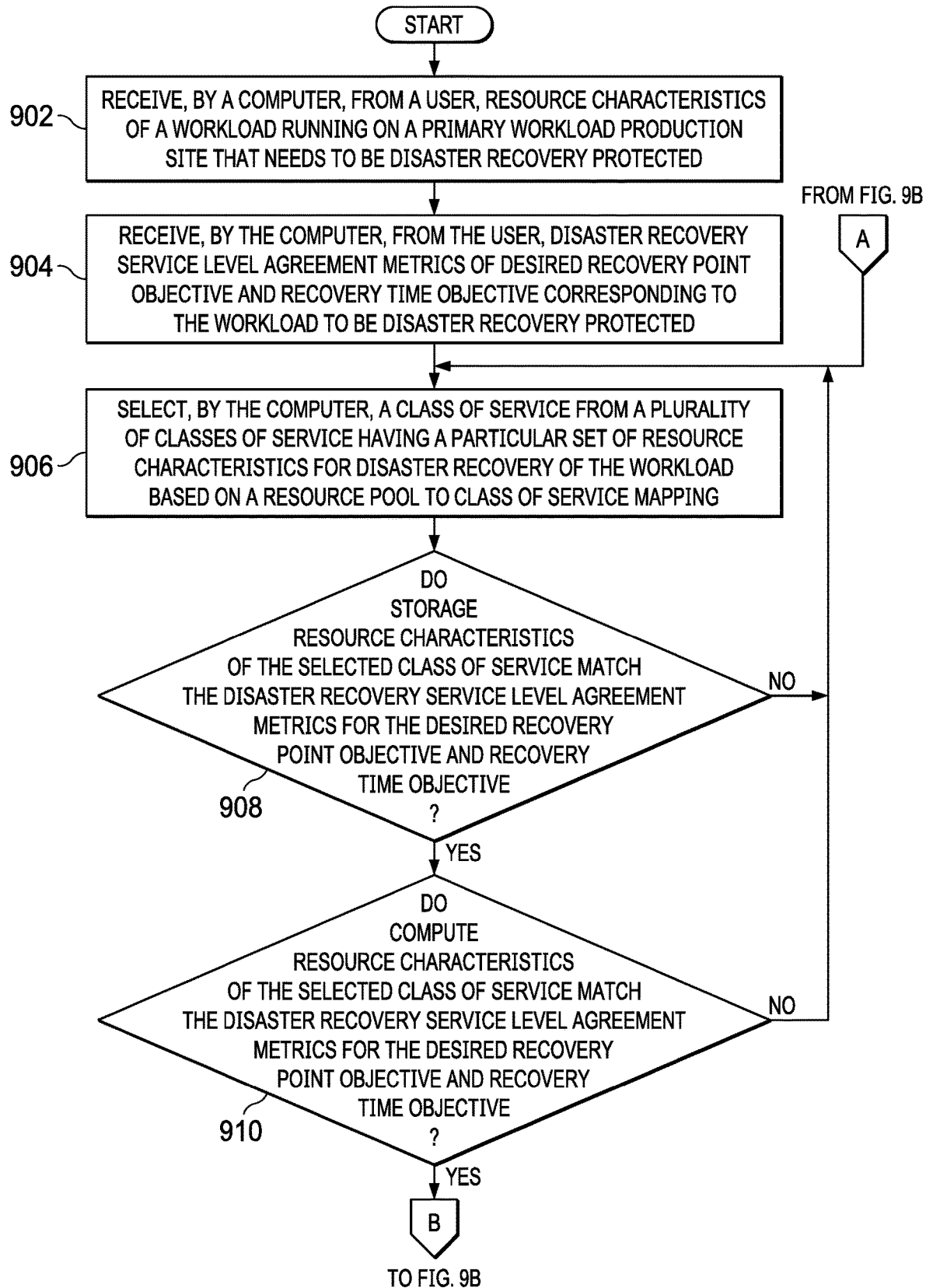

PROVISIONING DISASTER RECOVERY RESOURCES ACROSS MULTIPLE DIFFERENT ENVIRONMENTS BASED ON CLASS OF SERVICE

BACKGROUND

1. Field

The disclosure relates generally to disaster recovery and more specifically to provisioning disaster recovery resources across a plurality of different cloud environments based on classes of service, each class of service mapped to a group of infrastructure resource objects comprising a resource pool.

2. Description of the Related Art

Disaster recovery involves a set of policies, tools, and procedures to enable the recovery or continuation of technology infrastructure and systems following a natural or human-induced disaster. Disaster recovery focuses on the information technology or technology systems supporting critical business functions, as opposed to business continuity, which focuses on keeping all essential aspects of a business functioning despite significant disruptive events. As a result, disaster recovery can be considered as a subset of business continuity.

A business continuity plan reflects recovery point objective and recovery time objective. A recovery point objective is defined by business continuity planning and is the maximum targeted period in which data (e.g., transaction data) may be lost from a service due to a disaster or disruption. The recovery time objective is the targeted duration of time and service level within which a business process must be restored after the disaster or disruption to avoid unacceptable consequences associated with a break in the business continuity.

SUMMARY

According to one illustrative embodiment, a computer-implemented method for disaster recovery resource provisioning is provided. A computer groups infrastructure resource objects into a plurality of resource pools based on resource characteristics of each respective infrastructure resource object. The computer provides a set of resource capabilities for seamless resource provisioning for each resource pool in the plurality of resource pools. The computer maps a class of service to a resource pool corresponding to a workload spread across multiple environments considering primary workload production and secondary disaster recovery requirements. The computer automatically provisions resources from the class of service required in providing disaster recovery for the workload based on characteristics of the workload, cost, business needs, and service level agreement metrics corresponding to the disaster recovery. According to other illustrative embodiments, a computer system and computer program product for disaster recovery resource provisioning are provided.

BRIEF DESCRIPTION OF THE DRAWINGS

FIG. 7 is a flowchart illustrating a process for provisioning disaster recovery resources across a plurality of different environments based on class of service in accordance with an illustrative embodiment;

FIG. 8 is a flowchart illustrating a process for identifying a class of service in accordance with an illustrative embodiment; and FIGS. 9A-9B are a flowchart illustrating a process for using a class of service during disaster recovery of a workload in accordance with an illustrative embodiment.

DETAILED DESCRIPTION

Figure 1:
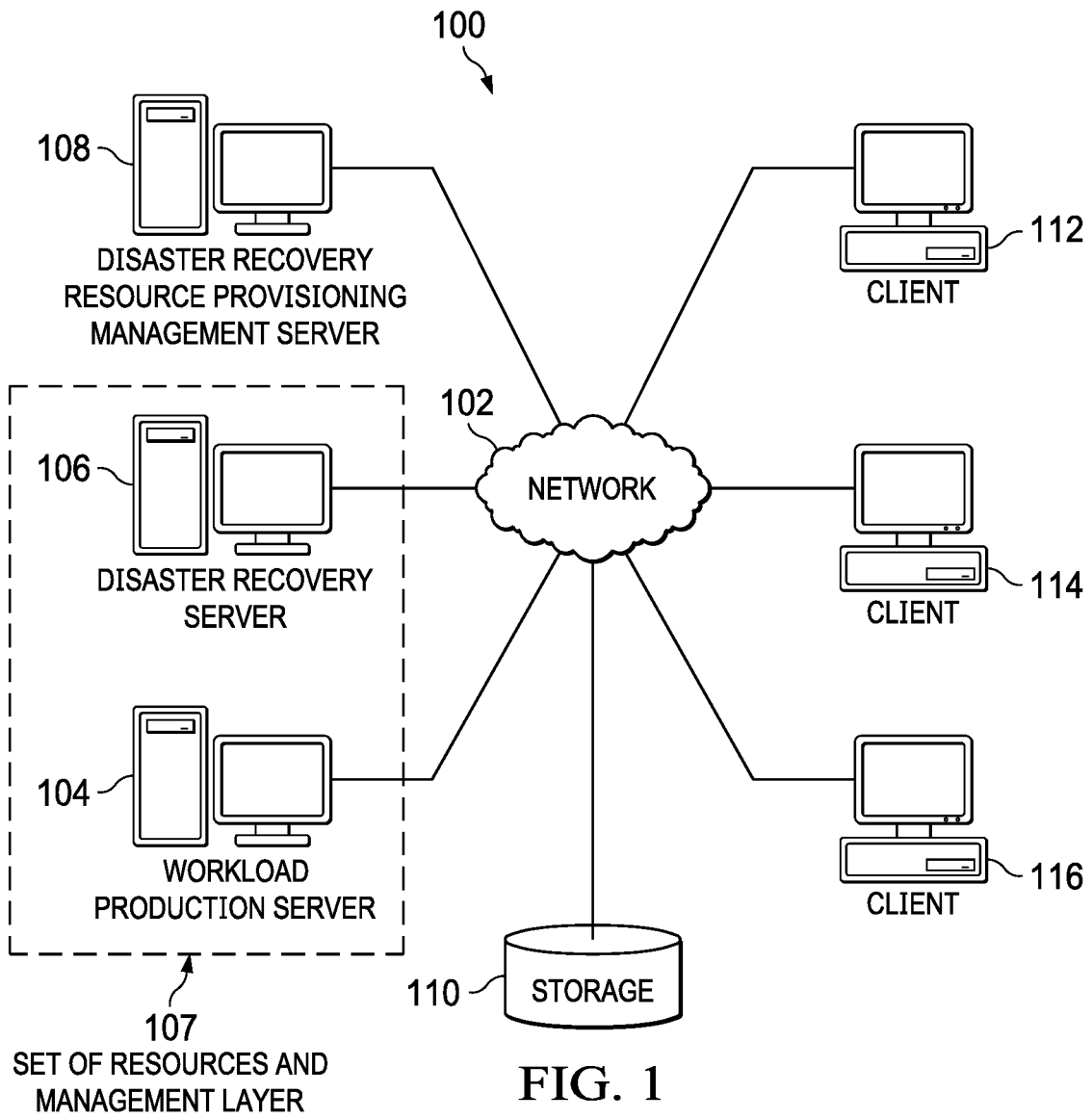
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, workload production server 104, disaster recovery server 106, and disaster recovery resource provisioning management server 108 connect to network 102, along with storage 110. Workload production server 104, disaster recovery server 106, and disaster recovery resource provisioning management server 108 may be, for example, server computers with high-speed connections to network 102. In addition, workload production server 104 and disaster recovery server 106 are included in set of resources and management layer 107. Workload production server 104 is a part of a primary production site and provides one or more online services, such as, for example, retail services, financial services, banking services, governmental services, educational services, reservation services, data services, event monitoring services, and the like, to client devices. The primary production site represents a set of workloads to be protected at a disaster recovery site. Workloads may be physical (e.g., standalone) or virtual using a virtualization technology. Disaster recovery server 106 is part of the disaster recovery site and provides disaster recovery of the set of workloads (e.g., production data associated with the set of workloads, which is generated by workload production server 104 while performing requested services and is transmitted to disaster recovery server 106 by workload production server 104). Disaster recovery resource provisioning management server 108 provisions infrastructure resource objects across workload production server 104 and disaster recovery server 106 for disaster recovery based on classes of service. Disaster recovery resource provisioning management server 108 maps each class of service to a group of infrastructure resource objects, such as, for example, one or more compute resources, one or more storage resources, one or more network resources, and the like, which comprise a resource pool, based on related resource characteristics, such as processor speed, storage speed, class and type, and network throughput, and service level agreement metrics for recovery point objective and recovery time objective associated with different types of workloads.

Also, it should be noted that workload production server 104, disaster recovery server 106, and disaster recovery resource provisioning management server 108 may each represent computing nodes in a plurality of different cloud environments. Alternatively, workload production server 104, disaster recovery server 106, and disaster recovery resource provisioning management server 108 may each represent clusters of servers in a plurality of different data centers or in a combination of cloud environments and data centers.

Client 112, client 114, and client 116 also connect to network 102. Clients 112, 114, and 116 are clients of workload production server 104. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, smart appliances, gaming devices, kiosks, and the like. Users of clients 110, 112, and 114 may utilize clients 110, 112, and 114 to access and utilize the services provided by workload production server 104.

Storage 110 is a network storage device capable of storing any type of data in a structured format or an unstructured format. In addition, storage 110 may represent a plurality of network storage devices. Further, storage 110 may store identifiers and network addresses for a plurality of different servers, identifiers and network addresses for a plurality of different client devices, identifiers for a plurality of different client device users, and the like. Furthermore, storage 110 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on disaster recovery resource provisioning management server 108 and downloaded to workload production server 104 and disaster recovery server 106 over network 102 for use on workload production server 104 and disaster recovery server 106. Further, workload production server 104 may provide information, such as, for example, software applications and updates, to clients 110, 112, and 114.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
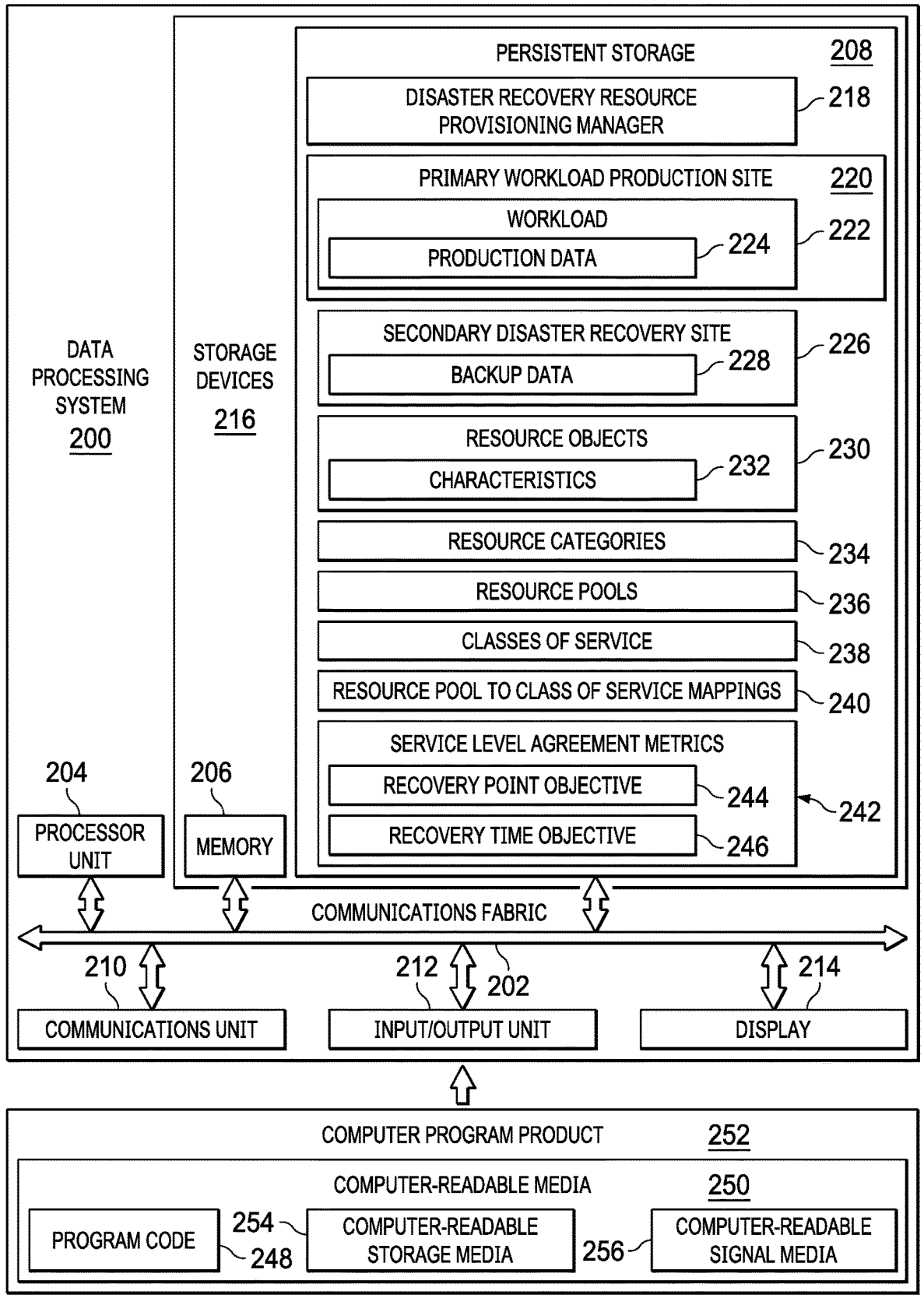
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as disaster recovery resource provisioning management server 108 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores disaster recovery resource provisioning manager 218. However, it should be noted that even though disaster recovery resource provisioning manager 218 is illustrated as residing in persistent storage 208, in an alternative illustrative embodiment disaster recovery resource provisioning manager 218 may be a separate component of data processing system 200. For example, disaster recovery resource provisioning manager 218 may be a hardware component coupled to communication fabric 202 or a combination of hardware and software components. In another alternative illustrative embodiment, a set of components of disaster recovery resource provisioning manager 218 may be located in data processing system 200 and a second set of components of disaster recovery resource provisioning manager 218 may be located in one or more other data processing systems, such as, for example, workload production server 104 and/or disaster recovery server 106 in FIG. 1.

Disaster recovery resource provisioning manager 218 controls or orchestrates, using third-party resources mangers, the process of provisioning infrastructure resource objects across primary workload production site 220 and secondary disaster recovery site 226 for disaster recovery based on classes of service 238. Primary workload production site 220 represents an identifier for a primary location that contains a set of one or more workload production servers, such as, for example, workload production server 104 in FIG. 1, which runs workload 222. Workload 222 represents a set of one or more workloads that perform services requested by client devices. In other words, workload 222 may represent any type and number of workloads running on primary workload production site 220. Production data 224 represent information associated with workload 222 and data generated by the set of workload production servers while running workload 222.

Secondary disaster recovery site 226 represents an identifier of a secondary location, which is remote from the location associated with primary workload production site 220, that contains a set of one or more disaster recovery servers, such as, for example, disaster recovery server 106 in FIG. 1, providing disaster recovery for production data 224 during a natural or man-made disaster or disruption. Secondary disaster recovery site 226 receives a copy of production data 224 from primary workload production site 220 and stores the copy of production data 224 as backup data 228. In other words, secondary disaster recovery site 226 utilizes backup data 228 to restore production data 224 on primary workload production site 220 after primary workload production site 220 recovers from a failure due to a disaster or disruption, for example.

Resource objects 230 represent a plurality of different types of infrastructure resource objects, such as, for example, processors, memory, hard disk drives, routers, and the like, corresponding to primary workload production site 220 and secondary disaster recovery site 226. Characteristics 232 represent the attributes, features, or traits of each resource object in resource objects 230, such as, for example, processor speed, amount of memory, storage capacity, router throughput per amount of time, software type, software category, software licensing, and the like.

Resource categories 234 represent a plurality of different categories, such as, for example, a compute resource category, a storage resource category, a network resource category, and the like. Disaster recovery resource provisioning manager 218 places each resource object in resource objects 230 into a resource category of resource categories 234 based on the type of each resource object. For example, disaster recovery resource provisioning manager 218 would place a processor in the compute resource category.

Resource pools 236 represent a plurality of different pools or groups of related resource objects. Disaster recovery resource provisioning manager 218 builds each resource pool by selecting a resource object having particular characteristics from each resource category. For example, disaster recovery resource provisioning manager 218 may select one or more high performance processors from the compute resource category, one or more high performance storage class memories from the storage resource category, and one or more high performance routers with high throughput from the network resource category to form one resource pool with high performance capabilities. Similarly, disaster recovery resource provisioning manager 218 may build resource pools with medium performance capabilities, low performance capabilities, or combinations of different performance characteristics and capabilities.

Further, disaster recovery resource provisioning manager 218 maps each resource pool in resource pools 236 to a class of service in classes of service 238 to form resource pool to class of service mapping 240. Classes of service 238 may include, for example, a high-level class of service, a medium-level class of service, a low-level class of service, and the like. Disaster recovery resource provisioning manager 218 maps each resource pool to a class of service based on resource capabilities of each resource pool to meet service level agreement metrics 242 for recovery point objective 244 and recovery time objective 246 associated with different types of workloads, such as, for example, workload 222. Recovery point objective 244 is defined by business continuity planning and is the maximum targeted period in which data may be lost from a service due to a disaster or disruption. Recovery time objective 246 is the targeted duration of time a service must be restored after the disaster or disruption in order to avoid unacceptable consequences associated with a break in the business continuity.

As a result, data processing system 200 operates as a special purpose computer system in which disaster recovery resource provisioning manager 218 in data processing system 200 enables provisioning of infrastructure resource objects across workload production and disaster recovery sites for disaster recovery based on class of service. In particular, disaster recovery resource provisioning manager 218 transforms data processing system 200 into a special purpose computer system as compared to currently available general purpose computer systems that do not have disaster recovery resource provisioning manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 258. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
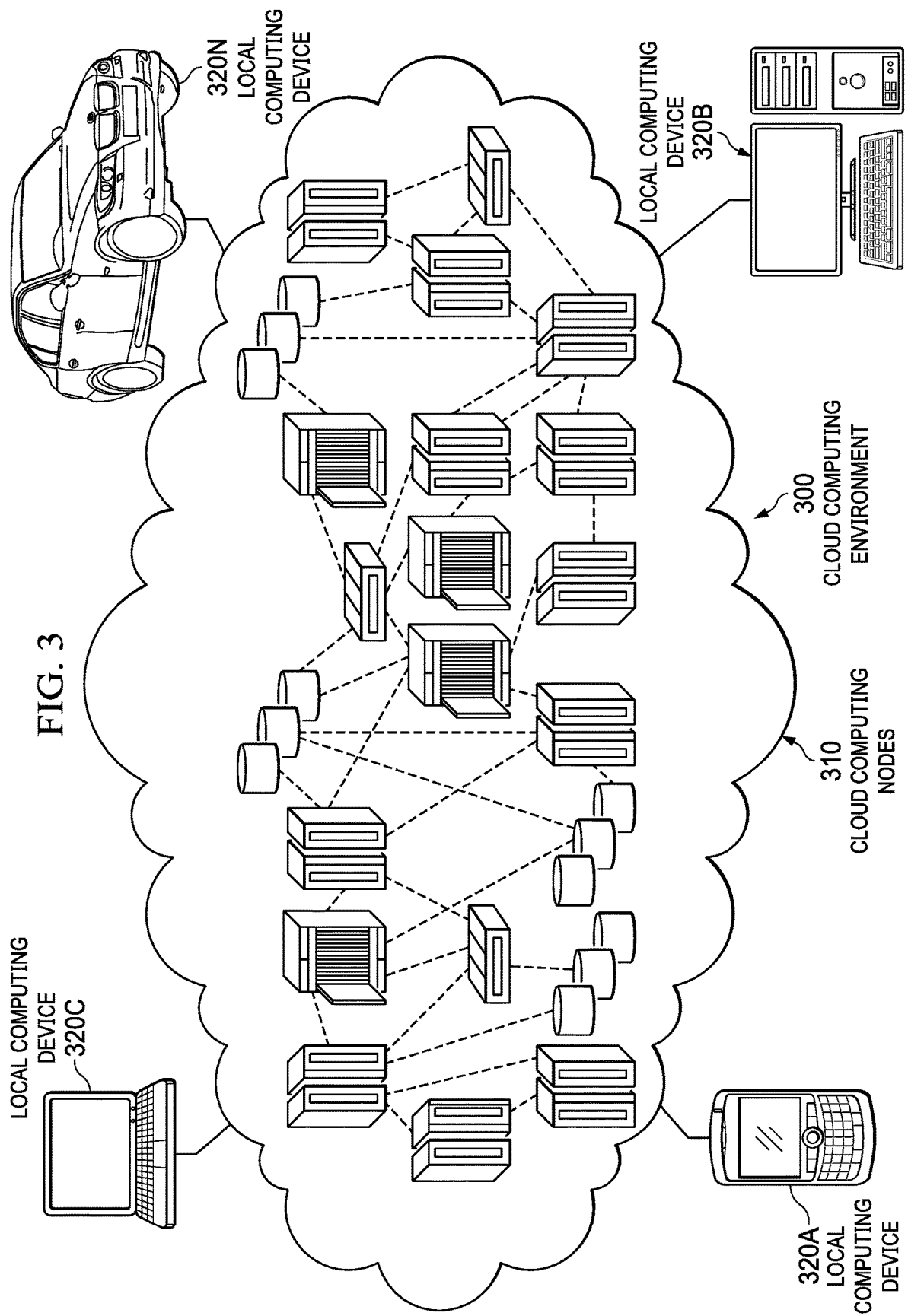
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, workload production server 104, disaster recovery server 106, and disaster recovery resource provisioning management server 108 in FIG. 1. Local computing devices 320A-320N may be, for example, clients 112-116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
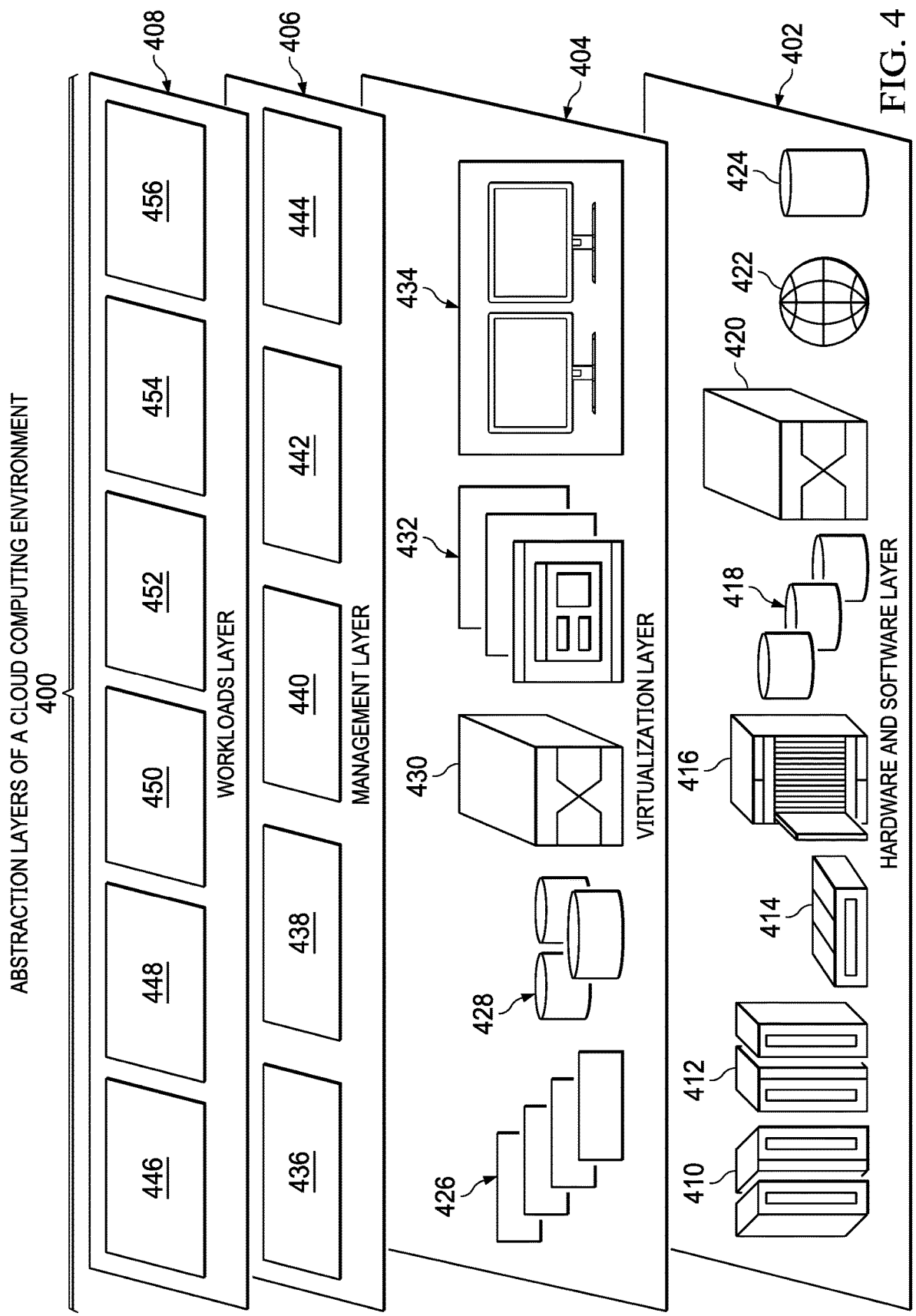
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and disaster recovery resource provisioning management 456.

Worldwide enterprises are strategically embracing and adopting cloud technology not just for workload deployment, but also for developing Business Continuity and Disaster Recovery (BCDR) plans for mitigating disruptions caused by natural and man-made disasters using on-premise, hybrid, and multi-cloud environment models for capital expenditure and operational expense advantages. Each cloud environment is built with its own set of hardware and software subsystems and is presented as an abstract system to consumers. This leads to complexity in configuration, provisioning, managing, and monitoring of the primary production and secondary disaster recovery lifecycle of workloads. For workload deployment and provisioning in a cloud, numerous cloud brokering solutions exist for providing vendor neutral methods and mechanisms addressing primary workload production sites. However, little or no cloud brokering solutions exist that consider both the primary workload production and the secondary disaster recovery aspects together, which is essential for addressing multi-cloud workload deployments that intermix applications across different cloud environments.

Enterprises are currently deploying both production workload and associated disaster recovery solutions across on-premise, hybrid, and multi-cloud environment models, which are deployed on heterogeneous, multi-vendor hardware and software sub-systems provided by numerous vendors and service providers. This wide spectrum of deployment methods presents complex challenges not only in the configuration, provisioning, managing, and monitoring aspects of a workload, but equally in the building and managing of disaster recovery solutions.

Illustrative embodiments support end-to-end life cycle management of workloads across the primary workload production site, which runs the workloads, and the corresponding secondary disaster recovery site, which manages disaster recovery of the workload by maintaining a backup copy of the production data transferred from the primary workload production site. A site defines a physical location where hardware and software components, datasets, and protection schemes are located. Illustrative embodiments achieve this end-to-end life cycle management of workloads across the primary workload production site and the corresponding secondary disaster recovery site by providing logical resources for workloads to operate on, independent of underneath physical resources. Illustrative embodiments group available resources as resource pools and map the resource pools to classes of service (i.e., based on service level agreements and policies) that provide a set of resource capabilities available for workloads to consume and provide the requested service.

Illustrative embodiments provision disaster recovery resources across multiple cloud environments by grouping related infrastructure resource objects into resource pools. Each resource pool provides a particular set of resource capabilities, which illustrative embodiments can use for seamless resource provisioning, as well as for disaster recovery life cycle management workflows in different business continuity modes, such as, for example, normal mode, failover mode, failback mode, switchover mode, switchback mode, and failover test exercise mode. A business continuity mode represents a current mode of a continuity group whose data illustrative embodiments are to protect during disruption or disaster.

Normal mode represents the day-to-day process of data protection occurring between the primary workload production site and the corresponding secondary disaster recovery site. Two continuity operations exist in normal mode: 1) initial normal full copy; and 2) recurring normal copy. Initial normal full copy in the process of initially copying and transferring the entire dataset from the primary workload production site to the corresponding secondary disaster recovery site. Initial normal full copy is a one-time process and may be paused and resumed. Recurring normal copy is the process of copying and transferring only the difference or delta in the dataset between the primary workload production site and the corresponding secondary disaster recovery site after the initial transfer of the entire dataset.

Failover mode is the process of transferring control or business continuity from the primary workload production site to the corresponding secondary disaster recovery site when the primary workload production site is down or inactive. Failback mode is the process of transferring the full dataset and control from the secondary disaster recovery site back to the corresponding primary workload production site. In failback mode operation, the corresponding primary workload production site is brought back up to production level. At the end of the operation, the dataset in the primary workload production site is ready for replication and the corresponding secondary disaster recovery site is in standby.

Switchover mode is the process of running the workload on the secondary disaster recovery site for a defined amount of time. In other words, the secondary disaster recovery site is now functioning as a primary workload production site and the primary workload production site is now functioning as a secondary disaster recovery site for a specified time period. The switchover operation may be executed after the initial normal full copy operation is performed or by manually stopping the recurring normal copy operation.

Switchback mode is the process of running the workload back on the primary workload production site from the secondary disaster recovery site. This is the same as the recurring normal copy operation. Once the switchback operation is performed, the recurring normal operation is started on the continuity group.

Failover test exercise mode is the process that provides intrusive and non-intrusive testing capabilities and tests disaster recovery readiness without impacting workload production. In other words, failover test exercise mode provides complete management control for performing disaster recovery test exercises and rehearsals.

Illustrative embodiments define, assign, and map resource pools (e.g., devices and subsystems) to a class of service. In other words, illustrative embodiments perform disaster recovery resource provisioning across different cloud environments or ecosystems by grouping related infrastructure resource objects into resource pools, considering compatible resource characteristics and capabilities.

At an enterprise level, enterprise administrators define organizational (i.e., service level agreement) metrics for various workloads based on business needs and considerations, such as, for example, response times, organization infrastructure budget, type of workloads, and the like. These defined service level agreement metrics act as a governing model for datacenter or cloud environments and are circulated to site level infrastructure administrators. For example, production workloads are defined with higher level resource capabilities, as compared to test workload requirements, both with minimum and maximum resource utilization thresholds and with a specific service level agreement level to operate on.

In the case of a private datacenter or cloud, where infrastructure administrators have complete visibility, these infrastructure administrators group and create resource pools, which satisfy the organizational service level agreement metrics and policies. Typically, in a software-defined datacenter such guidelines are used as policies, and are generally classified as, for example, platinum, gold, silver, and bronze policies. These policies are applied to infrastructure resource objects, such as, for example, compute resources, storage resources, network resources, software resources, infrastructure management resources, and the like. These policies may group compute resources based on performance characteristics, such as, for example, CPU type, speed, make, and the like. In addition, these policies may group storage resources based on, for example, type, such as solid-state disk, spinning disk, storage class memory, device input/output operations per second, data storage block, data storage file, and the like. Further, these policies may group network resources based on, for example, router, switch, port number groups, throughput, bandwidth, and the like. Furthermore, these policies may group software resources based on, for example, operating system, application type, application category, application licensing, clustering, and the like. Moreover, these policies may group infrastructure management resources based on, for example, provider, replication capabilities, high availability, mirroring, backup capabilities, and the like.

At an individual site level, based on supported resource capability metrics, such as, for example, provisioned compute type, storage type, and network, along with recovery point objective and recovery time objective capabilities of a device or subsystem, illustrative embodiments may map a group of resources forming a resource pool to a class of service, which the grouped set of resources are able to provide the necessary capabilities to perform at that class of service level. Recovery point objective is an acceptable amount of data loss from the last good data backup prior to the point of disaster or failure. Recovery time objective is the amount of time taken to bring a site back online following the disaster or failure. Illustrative embodiments map such resource capabilities to a workload class of service/policy, which the workload class of service/policy is capable of handling.

Illustrative embodiments provide a workflow for defining a class of service for disaster recovery resources. As a use case, consider a workload deployed on a primary workload production site having a set of compute, storage, network, and software infrastructure resources. Depending on specified service level agreement requirements on the primary workload production site, illustrative embodiments provision the workload on a resource pool. When the primary workload production site is active and only data replication needs to be performed on the secondary disaster recovery site, illustrative embodiments may assign to the secondary disaster recovery site a resource pool having lower or fewer resource capabilities, such as, for example, low compute and medium storage capabilities, which satisfy the data replication requirements. In other words, the same set of resources needed for production are not needed for data replication. Thus, illustrative embodiments do not provide a one-to-one mapping of resources from the primary workload production site to the secondary disaster recovery site for data replication on the secondary disaster recovery site. However, during disaster recovery, illustrative embodiments may instantiate additional resources to the disaster recovery resource pool, so that illustrative embodiments can achieve satisfactory service level agreement metrics. By operating at the resource pool level as a class of service, illustrative embodiments are capable of seamlessly managing disaster recovery workflows for workloads across different sites and environments.

By illustrative embodiments automatically identifying a class of service for disaster recovery resource pools, illustrative embodiments automatically satisfy agreed upon service level agreement resource capabilities. Operating at the resource capability level, illustrative embodiments seamlessly manage application life cycle. Also, operating at the resource pool level, illustrative embodiments build a shared resource infrastructure, which helps the integrator to optimize resource utilization across sites and environments. Moreover, by illustrative embodiments defining classes of service and evolving resource pool mappings in each site, this enables illustrative embodiments to provide seamless provisioning for both the primary workload production site and the corresponding secondary disaster recovery site.

Thus, illustrative embodiments offer disaster recovery monitoring, reporting, testing, and workflow automation capabilities of complex hybrid information technology environments across on-premise, hybrid, and multi-cloud ecosystems. Illustrative embodiments also act as an orchestrator integrating both local and remote disaster recovery management platforms. In the absence of a unified and common specification for cloud provisioning that includes disaster recovery provisioning, illustrative embodiments define workload policies, map underneath sub-systems of resources, and utilize them based on application requirements for provisioning both primary workload production and secondary disaster recovery sites and for providing end-to-end application management across the multiple sites and environments. Moreover, it should be noted that illustrative embodiments are not limited to replication, but illustrative embodiments can be applied to backup (e.g., snapshots), cyber resiliency, archiving, deployment, and migration workflows involving data and data movement or copy across different environments (i.e., sites).

Therefore, illustrative embodiments provide one or more technical solutions that overcome a technical problem with provisioning disaster recovery resources across both workload production and disaster recovery sites. As a result, these one or more technical solutions provide a technical effect and practical application in the field of disaster recovery.

Figure 5:
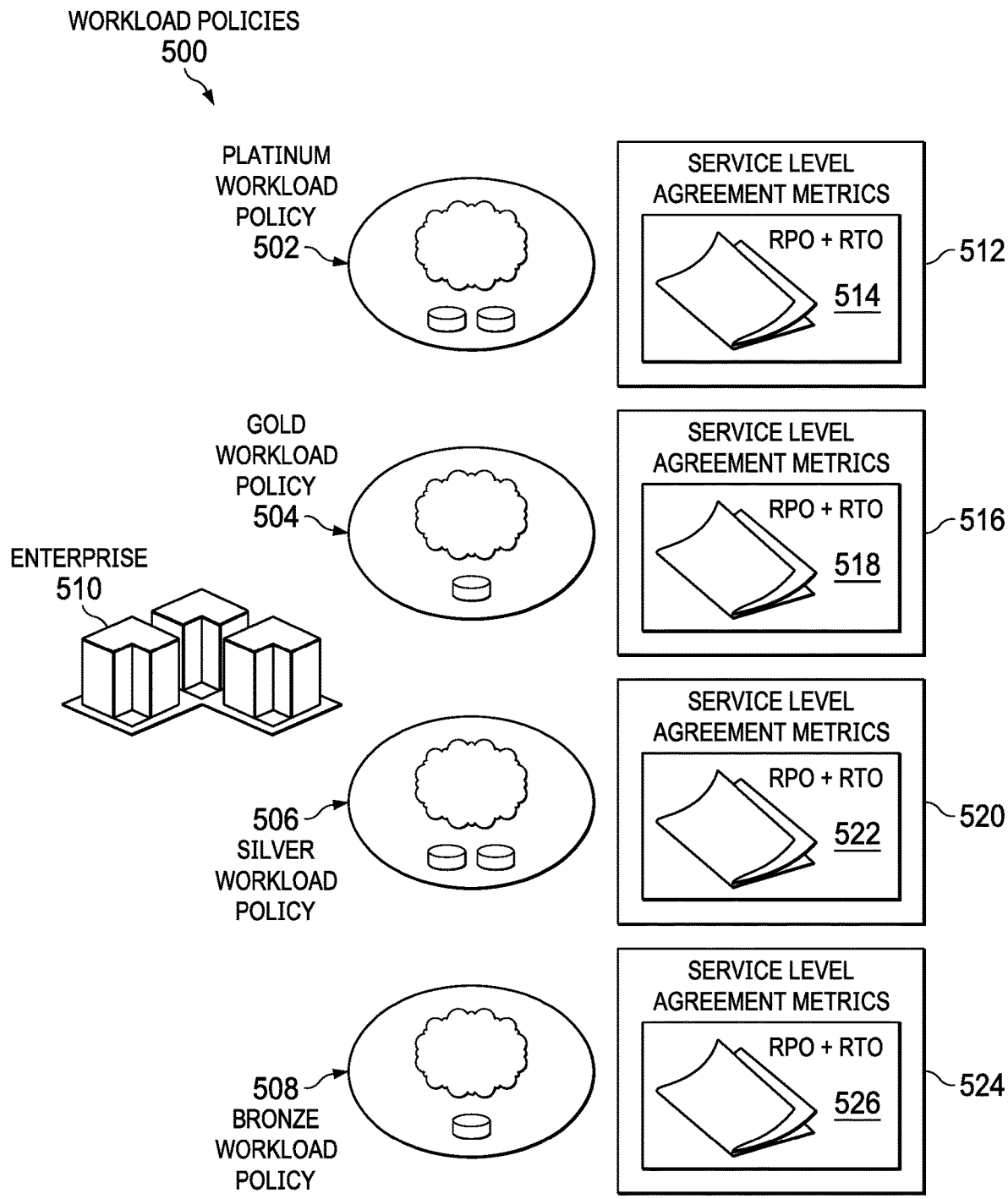
FIG. 5 is a diagram illustrating an example of workload policies in accordance with an illustrative embodiment.

With reference now to FIG. 5, a diagram illustrating an example of workload policies is depicted in accordance with an illustrative embodiment. Workload policies 500 may be implemented in a network of data processing systems, such as network data processing system 100 in FIG. 1, or a cloud computing environment, such as cloud computing environment 300 in FIG. 3.

In this example, workload policies 500 include platinum workload policy 502, gold workload policy 504, silver workload policy 506, and bronze workload policy 508. However, it should be noted that workload policies 500 are intended as examples only and not as limitations on illustrative embodiments. In other words, alternative illustrative embodiments may include any type and number of workload policies.

An administrator of enterprise 510 may define workload policies 500 based on, for example, different levels or degrees of service level agreement metrics corresponding to different workloads. In this example, the enterprise administrator assigns service level agreement metrics 512 for recovery point objective and recovery time objective 514 to platinum workload policy 502. Service level agreement metrics 512 for recovery point objective and recovery time objective 514 may require a higher level of resource capabilities to run a higher priority workload as compared to service level agreement metrics 516 for recovery point objective and recovery time objective 518 assigned to gold workload policy 504 for a lower priority workload requiring a lower level of resource capabilities. Similarly, service level agreement metrics 520 for recovery point objective and recovery time objective 522 assigned to silver workload policy 506 may require a medium level of resource capabilities to run a medium priority workload as compared to service level agreement metrics 524 for recovery point objective and recovery time objective 526 assigned to bronze workload policy 508 for a lowest priority workload requiring a lowest level of resource capabilities.

Figure 6:
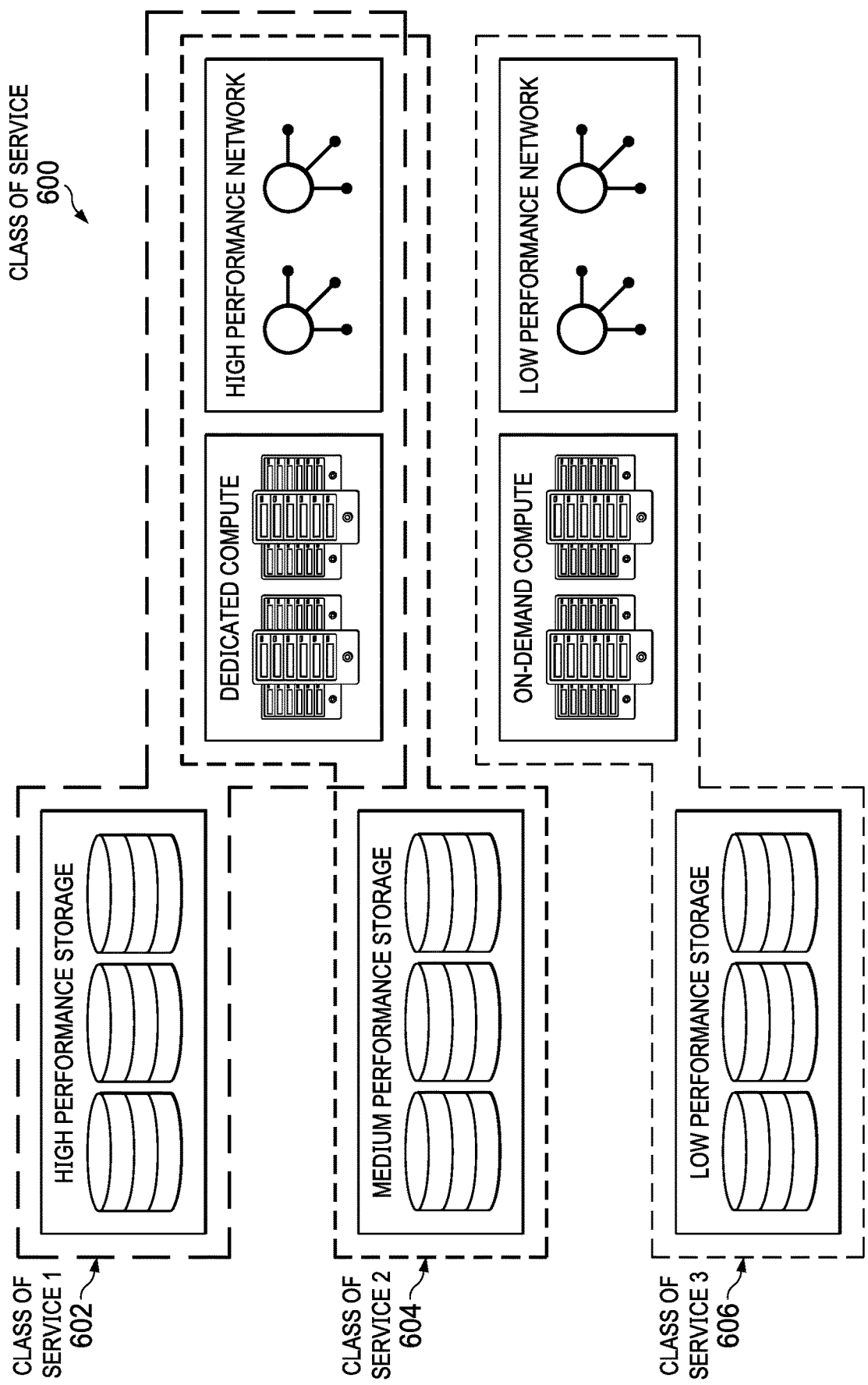
FIG. 6 is a diagram illustrating an example of classes of service in accordance with an illustrative embodiment.

With reference now to FIG. 6, a diagram illustrating an example of classes of service is depicted in accordance with an illustrative embodiment. Classes of service 600 may be implemented in a network of data processing systems, such as network data processing system 100 in FIG. 1, or a cloud computing environment, such as cloud computing environment 300 in FIG. 3.

In this example, classes of service 600 include class of service 1 602, class of service 2 604, and class of service 3 606. However, it should be noted that classes of service 600 are intended as examples only and not as limitations on illustrative embodiments. In other words, alternative illustrative embodiments may include any number of classes of service.

Also, it should be noted that each class of service in classes of service 600 includes a set of different infrastructure resource objects, such as, for example, one or more storage resources, one or more compute resources, one or more network resources, and the like. In this example, class of service 1 602 is a high-level class of service that comprises three high performance storage resources, two dedicated compute resources, and two high performance network resources. Class of service 2 604 is a medium-level class of service that comprises three medium performance storage resources, two dedicated compute resources, and two high performance network resources. Class of service 3 606 is a low-level class of service that comprises three low performance storage resources, two on-demand compute resources, and two low performance network resources.

Illustrative embodiments define classes of service 600 by first categorizing the infrastructure resource objects based on performance characteristics of each infrastructure resource object. For example, illustrative embodiments may categorize storage resources based on performance characteristics, such as number of device input/output operations per second and the like. After categorizing the infrastructure resource objects, illustrative embodiments group the infrastructure resource objects by selecting one type of resource from each category. Then, illustrative embodiments define each class of service for disaster recovery by mapping to a particular group of infrastructure resource objects. For example, illustrative embodiments may map a particular class of service to high performance storage, with dedicated compute resources and high throughput networks, such as class of service 1 602. Afterward, illustrative embodiments automatically provision the group of infrastructure resource objects for the selected class of service based on needs of a workload during disaster recovery and the requested disaster recovery service level agreement metrics corresponding to the workload.

With reference now to FIG. 7, a flowchart illustrating a process for provisioning disaster recovery resources across a plurality of different environments based on class of service is shown in accordance with an illustrative embodiment. The process shown in FIG. 7 may be implemented in a computer, such as, for example, disaster recovery resource provisioning management server 108 in FIG. 1, data processing system 200 in FIG. 2, or a cloud computing node in cloud computing nodes 310 in FIG. 3.

The process begins when the computer groups infrastructure resource objects into a plurality of resource pools based on resource characteristics of each respective infrastructure resource object (step 702). In addition, the computer provides a set of resource capabilities for seamless resource provisioning for each resource pool in the plurality of resource pools (step 704). Further, the computer maps a class of service to a resource pool corresponding to a workload spread across multiple environments considering both primary workload production and secondary disaster recovery requirements (step 706). Furthermore, the computer automatically provisions resources from the class of service required in providing disaster recovery for the workload based on characteristics of the workload, cost, business needs, and service level agreement metrics corresponding to the disaster recovery (step 708). Thereafter, the process terminates.

With reference now to FIG. 8, a flowchart illustrating a process for identifying a class of service is shown in accordance with an illustrative embodiment. The process shown in FIG. 8 may be implemented in a computer, such as, for example, disaster recovery resource provisioning management server 108 in FIG. 1, data processing system 200 in FIG. 2, or a cloud computing node in cloud computing nodes 310 in FIG. 3.

The process begins when the computer identifies a resource category for each type of infrastructure resource object corresponding to workload production and disaster recovery (step 802). The computer groups infrastructure resource objects together into a plurality of resource pools by selecting a resource object from each identified resource category based on resource characteristics to form each respective resource pool (step 804). The computer maps each respective resource pool in the plurality of resource pools to a corresponding class of service in a plurality of classes of service based on the resource characteristics of each respective resource pool (step 806). The computer uses the mapping during disaster recovery to identify a particular class of service having a set of resource capabilities that satisfies service level agreement metrics corresponding to the disaster recovery of a particular workload (step 808). Thereafter, the process terminates.

Figure 9B:
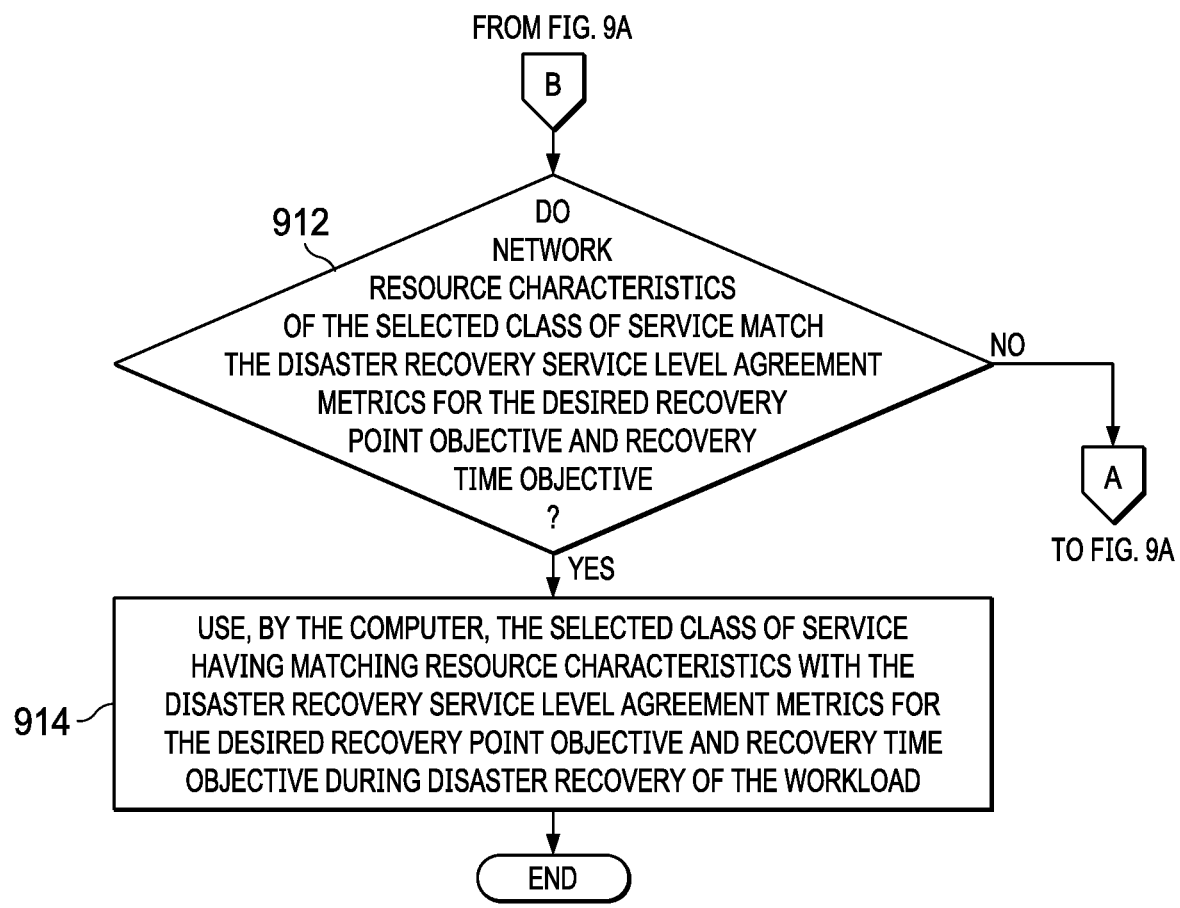

With reference now to FIGS. 9A-9B, a flowchart illustrating a process for using a class of service during disaster recovery of a workload is shown in accordance with an illustrative embodiment. The process shown in FIGS. 9A-9B may be implemented in a computer, such as, for example, disaster recovery resource provisioning management server 108 in FIG. 1, data processing system 200 in FIG. 2, or a cloud computing node in cloud computing nodes 310 in FIG. 3.

The process begins when the computer receives, from a user, resource characteristics of a workload running on a primary workload production site that needs to be disaster recovery protected (step 902). In addition, the computer receives, from the user, disaster recovery service level agreement metrics of desired recovery point objective and recovery time objective corresponding to the workload to be disaster recovery protected (step 904).

The computer selects a class of service from a plurality of classes of service having a particular set of resource characteristics for disaster recovery of the workload based on a resource pool to class of service mapping (step 906). Then, the computer makes a determination as to whether storage resource characteristics of the selected class of service match the disaster recovery service level agreement metrics for the desired recovery point objective and recovery time objective (step 908). If the computer determines that the storage resource characteristics of the selected class of service do not match the disaster recovery service level agreement metrics for the desired recovery point objective and recovery time objective, no output of step 908, then the process returns to step 906 where the computer selects another class of service from the plurality of classes of service having a different set of resource characteristics. If the computer determines that the storage resource characteristics of the selected class of service do match the disaster recovery service level agreement metrics for the desired recovery point objective and recovery time objective, yes output of step 908, then the computer makes a determination as to whether compute resource characteristics of the selected class of service match the disaster recovery service level agreement metrics for the desired recovery point objective and recovery time objective (step 910).

If the computer determines that the compute resource characteristics of the selected class of service do not match the disaster recovery service level agreement metrics for the desired recovery point objective and recovery time objective, no output of step 910, then the process returns to step 906 where the computer selects another class of service from the plurality of classes of service having a different set of resource characteristics. If the computer determines that the compute resource characteristics of the selected class of service do match the disaster recovery service level agreement metrics for the desired recovery point objective and recovery time objective, yes output of step 910, then the computer makes a determination as to whether network resource characteristics of the selected class of service match the disaster recovery service level agreement metrics for the desired recovery point objective and recovery time objective (step 912).

If the computer determines that the network resource characteristics of the selected class of service do not match the disaster recovery service level agreement metrics for the desired recovery point objective and recovery time objective, no output of step 912, then the process returns to step 906 where the computer selects another class of service from the plurality of classes of service having a different set of resource characteristics. If the computer determines that the network resource characteristics of the selected class of service do match the disaster recovery service level agreement metrics for the desired recovery point objective and recovery time objective, yes output of step 912, then the computer uses the selected class of service having matching resource characteristics with the disaster recovery service level agreement metrics for the desired recovery point objective and recovery time objective during disaster recovery of the workload (step 914). Thereafter, the process terminates.

Thus, illustrative embodiments of the present invention provide a computer-implemented method, computer system, and computer program product for provisioning disaster recovery resources across a plurality of different cloud environments based on classes of service, each class of service mapped to a group of infrastructure resource objects comprising a resource pool. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for disaster recovery resource provisioning, the computer-implemented method comprising:
grouping, by a computer, infrastructure resource objects into a plurality of resource pools based on resource characteristics of each respective infrastructure resource object;
providing, by the computer, a set of resource capabilities used by the computer to represent a performance level of each resource pool in the plurality of resource pools;
mapping, by the computer, a class of service to a first resource pool corresponding to a workload to be run on a primary workload production site spread across multiple environments considering primary workload production and disaster recovery resource requirements and based on the resource capabilities of each resource pool in the plurality of resource pools;
assigning, by the computer, a second resource pool for operation of a secondary disaster recovery site while the primary workload production site has not failed, wherein the second resource pool is different than the first resource pool, wherein the computer does not perform a one-to-one mapping of resources from a primary workload production site to a secondary disaster recovery site, and wherein the second resource pool is selected to match service level agreement metrics corresponding to disaster recovery; and
automatically provisioning, by the computer, responsive to detection of a failure of the primary workload processing site due to a natural or man-made disaster or disruption, resources from the class of service required in providing disaster recovery for the workload based on characteristics of the workload, cost, business needs, and the service level agreement metrics corresponding to the disaster recovery, wherein automatically provisioning resources further comprises instantiating additional resources for use by the secondary disaster recovery site.

2. The computer-implemented method of claim 1 further comprising:
identifying, by the computer, a resource category for each type of infrastructure resource object corresponding to primary workload production and secondary disaster recovery; and
grouping, by the computer, the infrastructure resource objects together into the plurality of resource pools by selecting a resource object from each identified resource category based on resource characteristics to form each respective resource pool.

3. The computer-implemented method of claim 1 further comprising:
mapping, by the computer, each respective resource pool in the plurality of resource pools to a corresponding class of service in a plurality of classes of service based on the resource characteristics of each respective resource pool; and
using, by the computer, the mapping during disaster recovery to identify a particular class of service having a set of resource capabilities that satisfies the service level agreement metrics corresponding to the disaster recovery of the workload.

4. The computer-implemented method of claim 1 further comprising:
receiving, by the computer, from a user, resource characteristics of the workload running on a primary workload production site that needs to be disaster recovery protected; and receiving, by the computer, from the user, disaster recovery service level agreement metrics of recovery point objective and recovery time objective corresponding to the workload to be disaster recovery protected.

5. The computer-implemented method of claim 1 further comprising:
  selecting, by the computer, the class of service from a plurality of classes of service that has a particular set of resource characteristics for the disaster recovery of the workload based on a resource pool to class of service mapping; and
  determining, by the computer, whether storage resource characteristics of the class of service match the service level agreement metrics corresponding to the disaster recovery for recovery point objective and recovery time objective.

6. The computer-implemented method of claim 5 further comprising:
  responsive to the computer determining that the storage resource characteristics of the class of service match the service level agreement metrics corresponding to the disaster recovery for the recovery point objective and the recovery time objective, determining, by the computer, whether compute resource characteristics of the class of service match the service level agreement metrics corresponding to the disaster recovery for the recovery point objective and the recovery time objective; and
  responsive to the computer determining that the compute resource characteristics of the class of service match the service level agreement metrics corresponding to the disaster recovery for the recovery point objective and the recovery time objective, determining, by the computer, whether network resource characteristics of the class of service match the service level agreement metrics corresponding to the disaster recovery for the recovery point objective and the recovery time objective.

7. The computer-implemented method of claim 6 further comprising:
  responsive to the computer determining that the network resource characteristics of the class of service match the service level agreement metrics corresponding to the disaster recovery for the recovery point objective and the recovery time objective, using, by the computer, the class of service having matching resource characteristics with the service level agreement metrics corresponding to the disaster recovery for the recovery point objective and the recovery time objective during the disaster recovery of the workload.

8. A computer system for disaster recovery resource provisioning, the computer system comprising:
  a bus system;
  a storage device connected to the bus system, wherein the storage device stores program instructions; and
  a processor connected to the bus system, wherein the processor executes the program instructions to: group infrastructure resource objects into a plurality of resource pools based on resource characteristics of each respective infrastructure resource object;
  provide a set of resource capabilities used by the computer system to represent a performance level of each resource pool in the plurality of resource pools;
  map a class of service to a first resource pool corresponding to a workload to be run on a primary workload production site spread across multiple environments considering primary workload production and disaster recovery resource requirements and based on the resource capabilities of each resource pool in the plurality of resource pools;
  assign a second resource pool for operation of a secondary disaster recovery site while the primary workload production site has not failed, wherein the second resource pool is different than the first resource pool, wherein the computer does not perform a one-to-one mapping of resources from a primary workload production site to a secondary disaster recovery site, and wherein the second resource pool is selected to match service level agreement metrics corresponding to disaster recovery; and
  automatically provision responsive to detection of a failure of the primary workload processing site due to a natural or man-made disaster or disruption, resources from the class of service required in providing disaster recovery for the workload based on characteristics of the workload, cost, business needs, and the service level agreement metrics corresponding to the disaster recovery, wherein automatically provisioning resources further comprises instantiating additional resources for use by the secondary disaster recovery site.

9. The computer system of claim 8, wherein the processor further executes the program instructions to:
  identify a resource category for each type of infrastructure resource object corresponding to primary workload production and secondary disaster recovery; and
  group the infrastructure resource objects together into the plurality of resource pools by selecting a resource object from each identified resource category based on resource characteristics to form each respective resource pool.

10. The computer system of claim 8, wherein the processor further executes the program instructions to:
  map each respective resource pool in the plurality of resource pools to a corresponding class of service in a plurality of classes of service based on the resource characteristics of each respective resource pool; and
  use the mapping during disaster recovery to identify a particular class of service having a set of resource capabilities that satisfies the service level agreement metrics corresponding to the disaster recovery of the workload.

11. The computer system of claim 8, wherein the processor further executes the program instructions to:
  receive, from a user, resource characteristics of the workload running on a primary workload production site that needs to be disaster recovery protected; and
  receive, from the user, disaster recovery service level agreement metrics of recovery point objective and recovery time objective corresponding to the workload to be disaster recovery protected.

12. A computer program product for disaster recovery resource provisioning, the computer program product comprising a computer readable storage medium having program instructions embodied therewith, the program instructions executable by a computer to cause the computer to perform a method comprising:
  grouping, by the computer, infrastructure resource objects into a plurality of resource pools based on resource characteristics of each respective infrastructure resource object;
  providing, by the computer, a set of resource capabilities used by the computer to represent a performance level of each resource pool in the plurality of resource pools;

mapping, by the computer, a class of service to a first resource pool corresponding to a workload to be run on a primary workload production site spread across multiple environments considering primary workload production and disaster recovery resource requirements and based on the resource capabilities of each resource pool in the plurality of resource pools;

assigning, by the computer, a second resource pool for operation of a secondary disaster recovery site while the primary workload production site has not failed, wherein the second resource pool is different than the first resource pool, wherein the computer does not perform a one-to-one mapping of resources from a primary workload production site to a secondary disaster recovery site, and wherein the second resource pool is selected to match service level agreement metrics corresponding to disaster recovery; and automatically provisioning, by the computer, responsive to detection of a failure of the primary workload processing site due to a natural or man-made disaster or disruption, resources from the class of service required in providing disaster recovery for the workload based on characteristics of the workload, cost, business needs, and the service level agreement metrics corresponding to the disaster recovery, wherein automatically provisioning resources further comprises instantiating additional resources for use by the secondary disaster recovery site.

13. The computer program product of claim 12 further comprising:

identifying, by the computer, a resource category for each type of infrastructure resource object corresponding to primary workload production and secondary disaster recovery; and grouping, by the computer, the infrastructure resource objects together into the plurality of resource pools by selecting a resource object from each identified resource category based on resource characteristics to form each respective resource pool.

14. The computer program product of claim 12 further comprising:

mapping, by the computer, each respective resource pool in the plurality of resource pools to a corresponding class of service in a plurality of classes of service based on the resource characteristics of each respective resource pool; and using, by the computer, the mapping during disaster recovery to identify a particular class of service having a set of resource capabilities that satisfies the service level agreement metrics corresponding to the disaster recovery of the workload.

15. The computer program product of claim 12 further comprising:

receiving, by the computer, from a user, resource characteristics of the workload running on a primary workload production site that needs to be disaster recovery protected; and receiving, by the computer, from the user, disaster recovery service level agreement metrics of recovery point objective and recovery time objective corresponding to the workload to be disaster recovery protected.

16. The computer program product of claim 12 further comprising:

selecting, by the computer, the class of service from a plurality of classes of service that has a particular set of resource characteristics for the disaster recovery of the workload based on a resource pool to class of service mapping; and determining, by the computer, whether storage resource characteristics of the class of service match the service level agreement metrics corresponding to the disaster recovery for recovery point objective and recovery time objective.

17. The computer program product of claim 16 further comprising:

responsive to the computer determining that the storage resource characteristics of the class of service match the service level agreement metrics corresponding to the disaster recovery for the recovery point objective and the recovery time objective, determining, by the computer, whether compute resource characteristics of the class of service match the service level agreement metrics corresponding to the disaster recovery for the recovery point objective and the recovery time objective; and responsive to the computer determining that the compute resource characteristics of the class of service match the service level agreement metrics corresponding to the disaster recovery for the recovery point objective and the recovery time objective, determining, by the computer, whether network resource characteristics of the class of service match the service level agreement metrics corresponding to the disaster recovery for the recovery point objective and the recovery time objective.

18. The computer program product of claim 16 further comprising:

responsive to the computer determining that the network resource characteristics of the class of service match the service level agreement metrics corresponding to the disaster recovery for the recovery point objective and the recovery time objective, using, by the computer, the class of service having matching resource characteristics with the service level agreement metrics corresponding to the disaster recovery for the recovery point objective and the recovery time objective during the disaster recovery of the workload.

* * * * *